(12) United States Patent
Skarp

(10) Patent No.: US 8,879,607 B2
(45) Date of Patent: Nov. 4, 2014

(54) INDOOR POSITIONING WITH RAKE RECEIVERS

(75) Inventor: Carl Filip Erik Skarp, Södra Sandby (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 503 days.

(21) Appl. No.: 13/208,388

(22) Filed: Aug. 12, 2011

(65) Prior Publication Data

US 2013/0039391 A1    Feb. 14, 2013

(51) Int. Cl.
- *H04B 1/00* (2006.01)
- *G01S 11/06* (2006.01)
- *G01S 5/14* (2006.01)
- *G01S 5/02* (2010.01)

(52) U.S. Cl.
CPC .............. *G01S 5/0215* (2013.01); *G01S 11/06* (2013.01); *G01S 5/14* (2013.01)
USPC ........... 375/148; 375/340; 342/350; 342/453; 342/458; 455/456.1; 455/456.3; 455/404.2; 455/456.5; 455/456.6; 701/408

(58) Field of Classification Search
CPC ............................... G01S 5/0252; G01S 13/00
USPC ............... 342/350, 453, 353, 458; 455/456.1, 455/456.3, 404.2, 456, 3, 456.5, 456.6; 701/408; 375/144, 148, 340
See application file for complete search history.

(56) References Cited

U.S. PATENT DOCUMENTS

| | | | |
|---|---|---|---|
| 6,320,536 B1 * | 11/2001 | Sasaki | 342/357.62 |
| 6,700,538 B1 * | 3/2004 | Richards | 342/458 |
| 7,035,632 B2 * | 4/2006 | Gutowski | 455/423 |
| 7,065,375 B2 | 6/2006 | Bonhonne | |
| 7,623,871 B2 * | 11/2009 | Sheynblat | 455/456.1 |
| 7,835,749 B1 * | 11/2010 | Hart et al. | 455/446 |
| 2005/0285792 A1 | 12/2005 | Sugar et al. | |
| 2007/0139269 A1 | 6/2007 | Chen et al. | |

OTHER PUBLICATIONS

Extended European Search Report dated Dec. 4, 2012 issued in corresponding EP application No. 12177096.0, 7 pages.

* cited by examiner

*Primary Examiner* — Sophia Vlahos
(74) *Attorney, Agent, or Firm* — Snyder, Clark, Lesch & Chung, LLP

(57) ABSTRACT

A method and a system for storing a constant path loss exponent corresponding to free space; transmitting a signal; receiving the signal via a rake receiver of a user device; identifying a maximum received signal strength based on a signal strength associated with the signal relative to fingers of the rake receiver; storing a current maximum received signal strength value; determining whether the current maximum received signal strength value is a first maximum received signal strength value; calculating a current indoor position of the user device based on the constant path loss exponent and the current maximum received signal strength value when a determination is that the current maximum received signal strength value is the first maximum received signal strength value; and outputting the current indoor position.

21 Claims, 13 Drawing Sheets

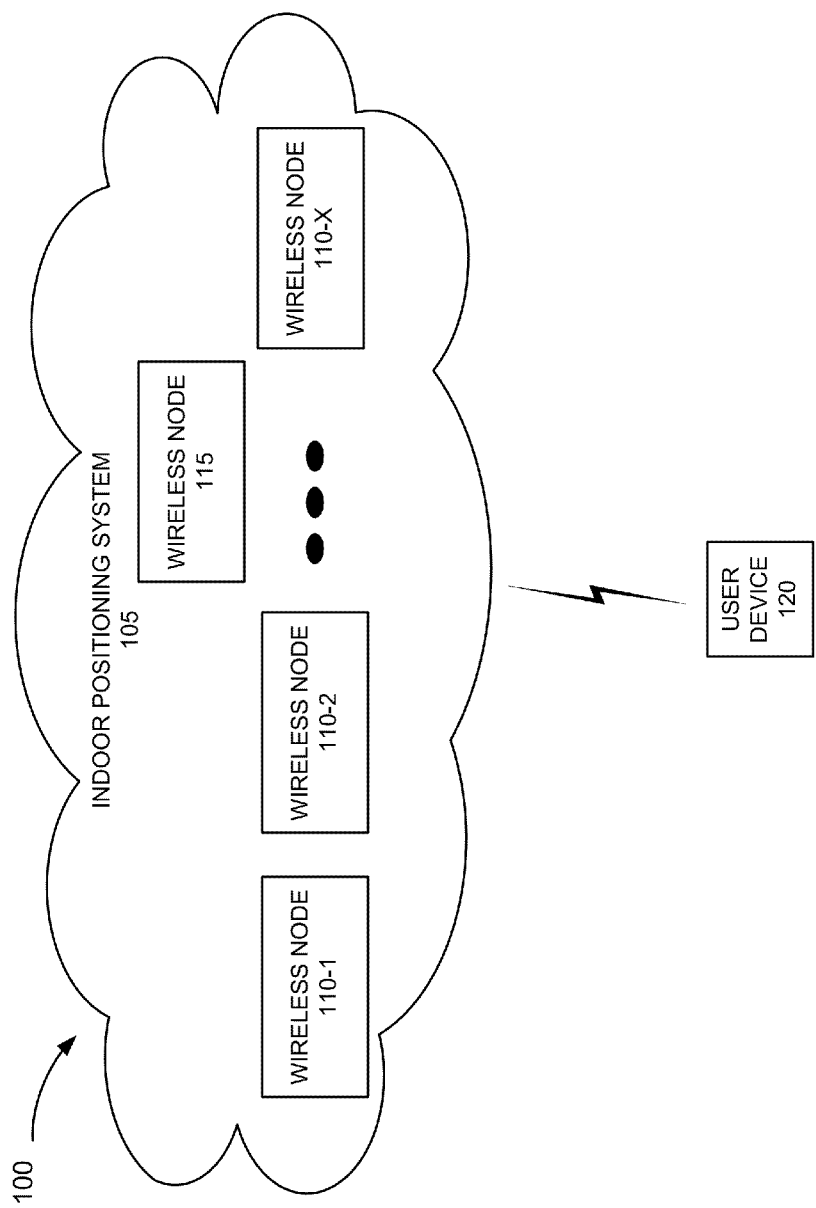

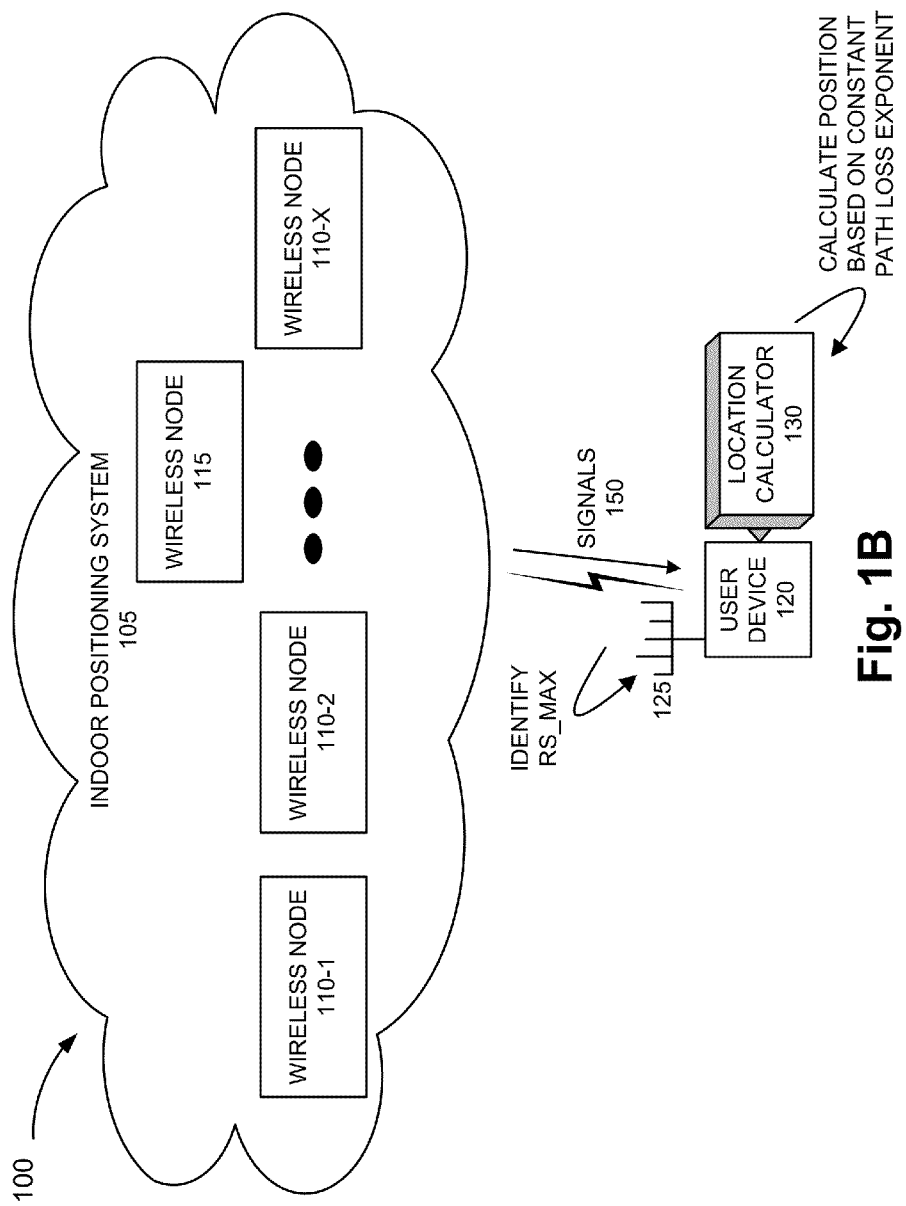

INDOOR POSITIONING WITH RAKE RECEIVERS

BACKGROUND

Current indoor positioning systems use, for instance, a Wireless Local Area Network (WLAN) or another type of network system for positioning when Global Positioning System (GPS) coverage or cellular coverage is poor or nonexistent. The most common way to compensate for loss of coverage is to use dead reckoning (e.g., via direction and distance) to maintain position location. The accuracy of this approach is directly related to the precision of the accelerometers, gyros, or other sensors used.

SUMMARY

According to one aspect, a method may comprise storing a constant path loss exponent corresponding to free space; receiving a signal via a rake receiver of a user device; identifying a maximum received signal strength based on a signal strength associated with the signal relative to fingers of the rake receiver; storing a current maximum received signal strength value based on the identifying; determining whether the current maximum received signal strength value is a first maximum received signal strength value; calculating a current indoor position of the user device based on the constant path loss exponent and the current maximum received signal strength value when a determination is that the current maximum received signal strength value is the first maximum received signal strength value; and outputting the current indoor position.

Additionally, the method may comprise transmitting the signal; storing previously identified maximum received signal strength values; comparing a current maximum received signal strength value to one or more previously identified maximum received signal strength values when a determination is that the current maximum received signal strength value is not the first maximum received signal strength value; and determining whether a difference in maximum received signal strength value indicates receipt by the user device of a direct signal component of the signal or a reflective signal component of the signal.

Additionally, the method may comprise calculating a current indoor position of the user device based on the constant path loss exponent and the compared, current maximum received signal strength value when the difference indicates that the compared, current maximum received signal strength value corresponds to the direct signal component of the signal; and recalculating one or more previous indoor positions of the user device based on the current indoor position of the user device associated with the compared, current maximum received signal strength value.

Additionally, the method may comprise recalculating the one or more previous indoor positions of the user device based on at least one of accelerometer data, gyroscope data, or compass data pertaining to the user device.

Additionally, the method may comprise storing previous indoor positions of the user device; and selecting one or more of the previous indoor positions as one or more reference indoor positions when the difference in maximum received signal strength value indicates receipt by the user device of a reflective signal component of the signal.

Additionally, the method may comprise calculating a current indoor position of the user device based on the constant path loss exponent, the selected one or more previous indoor positions, and at least one of accelerometer data, gyroscope data, or compass data pertaining to the user device.

Additionally, the method may comprise calculating a current indoor position of the user device based on a weighting system associated with the difference in maximum received signal strength value.

Additionally, the method may comprise storing at least one of a threshold difference value, a range of difference values, or a maximum received signal strength signature; and determining whether the difference in maximum received signal strength value indicates receipt by the user device of the direct signal component of the signal or the reflective signal component of the signal based on the at least one of the threshold difference value, the range of difference values, or the maximum received signal strength signature.

According to another aspect, a user device may comprise a rake receiver; one or more memories that store instructions; and one or more processors that execute the instructions and configures the one or more processors to: receive a signal via the rake receiver; identify a maximum received signal strength based on a signal strength associated with the signal relative to fingers of the rake receiver; store a current maximum received signal strength value based on an identified maximum received signal strength; determine whether the current maximum received signal strength value is a first maximum received signal strength value; and calculate a current indoor position of the user device based on a path loss exponent corresponding to free space and the current maximum received signal strength value when a determination is that the current maximum received signal strength value is the first maximum received signal strength value.

Additionally, when calculating the current indoor position, the one or more processors may further execute the instructions and configure the one or more processors to: calculate the current indoor position based on a triangulation algorithm.

Additionally, the one or more processors may further execute the instructions and configure the one or more processors to: store previously identified maximum received signal strength values; compare a current maximum received signal strength value to one or more previously identified maximum received signal strength values when a determination is that the current maximum received signal strength value is not the first maximum received signal strength value; and determine whether a difference in maximum received signal strength value indicates receipt by the user device of a direct signal component of the signal or a reflective signal component of the signal.

Additionally, the one or more processors may further execute the instructions and configure the one or more processors to: calculate a current indoor position of the user device based on the path loss exponent and the compared, current maximum received signal strength value when the difference indicates that the compared, current maximum received signal strength value corresponds to the direct signal component of the signal; and recalculate one or more previous indoor positions of the user device based on the current indoor position of the user device associated with the compared, current maximum received signal strength value.

Additionally, when recalculating, the one or more processors may further execute the instructions and configure the one or more processors to: recalculate the one or more previous indoor positions of the user device based on at least one of accelerometer data, gyroscope data, or compass data pertaining to the user device.

Additionally, the one or more processors may further execute the instructions and configure the one or more processors to: store previous indoor positions of the user device; and select one or more of the previous indoor positions as one or more reference positions when the difference in maximum received signal strength value indicates receipt by the user device of a reflective signal component of the signal.

Additionally, the one or more processors may further execute the instructions and configure the one or more processors to: calculate a current indoor position of the user device based on the path loss exponent, the selected one or more previous indoor positions, and at least one of accelerometer data, gyroscope data, or compass data pertaining to the user device.

Additionally, the path loss exponent may be a dynamic value based on at least one of a measurement of temperature, humidity, or pressure of air pertaining to an indoor environment of the user device.

According to yet another aspect, a non-transitory storage medium may store instructions for: identifying a maximum received signal strength based on a signal received via a rake receiver; storing a current maximum received signal strength value based on an identified maximum received signal strength; determining whether the current maximum received signal strength value is a first maximum received signal strength value; and calculating one or more distances relative to one or more wireless nodes of an indoor positioning system based on a constant path loss exponent corresponding to free space and the current maximum received signal strength value when a determination is that the current maximum received signal strength value is the first maximum received signal strength value.

Additionally, the non-transitory storage medium may further store instructions for: storing previously identified maximum received signal strength values; comparing a current maximum received signal strength value to one or more previously identified maximum received signal strength values when a determination is that the current maximum received signal strength value is not the first maximum received signal strength value; and determining whether a difference in maximum received signal strength value indicates that the signal includes a direct signal component of the signal or a reflective signal component of the signal.

Additionally, the non-transitory storage medium may store instructions for: calculating a current indoor position of the communication device based on the constant path loss exponent and the compared, current maximum received signal strength value when the difference indicates that the compared, current maximum received signal strength value corresponds to the direct signal component of the signal; and recalculating one or more previous indoor positions of the communication device based on the current indoor position of the communication device associated with the compared, current maximum received signal strength value.

Additionally, the non-transitory storage medium may store instructions for: storing previous indoor positions of the communication device; selecting one or more of the previous indoor positions as one or more reference indoor positions when the difference in maximum received signal strength value indicates receipt by the communication device of a reflective signal component of the signal; and calculating a current indoor position of the communication device based on the constant path loss exponent, the selected one or more previous indoor positions, and at least one of accelerometer data, gyroscope data, or compass data pertaining to the communication device, wherein the current indoor position is calculated based on triangulation.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings:

FIG. 1A is a diagram illustrating an exemplary environment in which an exemplary embodiment of indoor positioning with rake receivers may be implemented;

FIG. 1B is a diagram illustrating an exemplary process of indoor positioning based on a rake receiver;

DETAILED DESCRIPTION

Figure 1C:
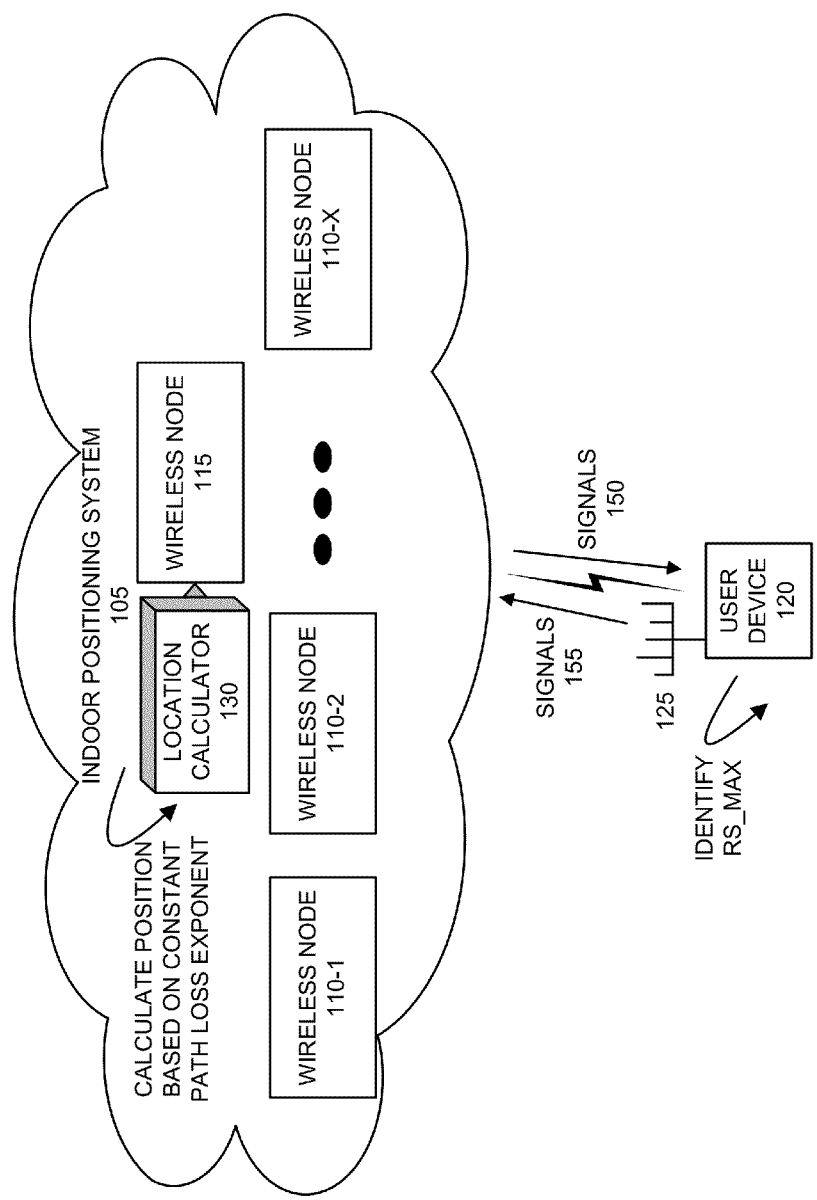
FIG. 1C is a diagram illustrating another exemplary process of indoor positioning based on a rake receiver.

The following detailed description refers to the accompanying drawings. The same reference numbers in different drawings may identify the same or similar elements. Also, the detailed description does not limit the invention. Rather the scope of the invention is defined by the appended claims.

Indoor positioning, indoor tracking, indoor navigation, and other location-based services present various problems since signals used by outdoor locating technologies are often ineffective. For example, GPS systems are not reliable indoors due to signal interference caused by the walls, floors, ceilings, furniture, etc. Also, cellular communication signals are not reliable for similar reasons.

An indoor positioning system may include wireless nodes (e.g., transmitters) that can be used to triangulate a position of a device (e.g., a user device). There are two primary methods for implementing a positioning system. The first method is self-positioning and the second method is remote positioning. Self-positioning involves the user device to determine its physical location. Remote positioning involves another device (e.g., a server device, a base station or other wireless node) to determine a position of the user device. The performance of an indoor positioning system may be measured based on various factors, such as, accuracy, convergence time, integrity (e.g., accuracy error is within a particular range), availability, continuity (e.g., time period for which the service is available), etc.

Depending on the indoor positioning service, the type of position information may vary. For example, a physical location may be expressed in the form of coordinates, such as degree/minutes/seconds. Alternatively, other types of position information may be used, such as, symbolic location (e.g., on the first floor in the office), an absolute location based on a shared reference grid, or a relative location (e.g., proximity to a reference point(s)). Additionally, indoor positioning systems may be used to locate a person, an object, or a device.

In an environment with known propagation losses, signal strength can be converted to distance. For example, according to a triangulation approach to determine a user's location, the distance to the transmitter may be determined by measuring the received signal strength from a particular transmitter. The received signal, RS, is equal to the transmitted signal, Tx, minus the path loss, PL, as expressed in equation (1) below.

$$RS = Tx - PL \tag{1}$$

Equation (1) may be valid for signals and losses in power (e.g., dB, etc.). The path loss, PL, may be expressed according to equation (2) below.

$$PL = PL_0 + 10\gamma \log_{10}\left(\frac{d}{d_0}\right) + X_g \tag{2}$$

In equation (2) above, $PL_0$ is the path loss at a reference distance $d_0$ from the transmitter; d is the distance from the transmitter, $\gamma$ is the path loss exponent and $X_g$ describes the flat fading as a random variable with zero mean. The distance to the transmitter may be expressed according to equation (3) as follows:

$$d = d_0 * 10^{\frac{PL - PL_0 - X_g}{10\gamma}} \tag{3}$$

As expressed in equation (3), distance is significantly dependent on the path loss exponent, $\gamma$. The path loss exponent is a factor that takes the propagation of a signal into account (i.e., the loss due to multi-path propagation, reflections, etc.). The path loss exponent is dependent on the frequency and the environment and some empirical measurements, as illustrated in Table 1 below.

TABLE 1

| Building Type | Frequency of Transmission | $\gamma$ |
|---|---|---|
| Free Space (Air) | | 2.0 |
| Retail Store | 914 MHz | 2.2 |
| Grocery Store | 914 MHz | 1.8 |
| Office with hard partition | 1.5 GHz | 3.0 |
| Office with soft partition | 900 MHz | 2.4 |
| Office with soft partition | 1.9 GHz | 2.6 |
| Textile or chemical | 1.3 GHz | 2.0 |
| Textile or chemical | 4.0 GHz | 2.1 |
| Metalworking | 1.3 GHz | 1.6 |
| Metalworking | 1.3 GHz | 3.3 |

Based on the information included in Table 1, the path loss exponent can be extremely difficult to determine. In other words, other than in the free space case (e.g. in air), the path loss coefficient value is an estimated value.

Current solutions used in indoor positioning systems for selecting a path loss exponent value typically results in a guesstimated value that is believed to be a good compromise given the intricacies involved. However, since distance is exponentially dependent on a measured power, a small error in the estimation of $\gamma$ may result in a significant error when calculating distance d.

According to exemplary embodiments, a user device or an indoor positioning system may calculate a position of a device, an object, or a user. According to exemplary embodiment, a free space propagation model is used in which a constant path loss exponent is used rather than a dynamic path loss exponent value for calculating a distance (e.g., between a user device and a wireless node of the indoor positioning system). According to an exemplary embodiment, the path loss exponent is set to have a value of 2.X, in which X is empirically determined in free space (e.g., air). For example, X may have a value ranging from 0 to 1, in which the path loss exponent has a value between 2.0 and 2.1, including 2.0 and 2.1. Alternatively, the value of X may be represented with greater arithmetic precision by increasing the number of digits to 2, 3, 4, 5, etc. For example, the path loss exponent may have a value of 2.01, 2.005, etc. According to other embodiments, the path loss exponent may have a value outside of the range between 2.0 and 2.1.

According to another embodiment, the path loss exponent is substantially constant, but may be dynamic based on factors such as current air temperature, humidity, pressure, etc. The path loss exponent is also dependent on frequency. The dynamic value may be calculated by user device based on measurement(s) via sensor(s) of one or more of the aforementioned factors. Alternatively, the indoor positioning system may provide the dynamic path loss exponent to the user device, or when the indoor positioning system calculates the position of the user device, the indoor positioning system may simply store this information.

According to an exemplary embodiment, one or multiple wireless nodes transmit(s) a signal(s) to a user device. According to an exemplary embodiment, the user device includes a rake receiver. The user device determines a strongest component for each received signal based on the received signal strength associated with each rake finger of the rake receiver. The user device transmits the signal strength information and a timestamp to a wireless node of the indoor positioning system. A wireless node calculates the position of the user device relative to the indoor positioning system. For example, the wireless node may know the position of other wireless node(s) from which each transmitted signal was received by the user device. The wireless node provides the position of the user device to the user device. According to other embodiments, the user device may calculate its own position.

It may be assumed in a free space propagation model without consideration of reflection loss, that the most direct wave of a signal received by a receiver (e.g., a rake receiver) will be the strongest, in terms of power, relative to other parts of the received signal. In other words, the received signal power, $P_r$, is inversely proportional to the square of the distance, $r^2$, as expressed according to equation (4) below:

$$P_r \propto \frac{1}{r^2} \tag{4}$$

According to an exemplary embodiment, the strongest component of the received signal is used as a basis to determine indoor position, and other components of the signal are ignored, as described further below.

FIG. 1A is a diagram illustrating an exemplary environment in which an exemplary embodiment of indoor positioning with rake receivers may be implemented. As illustrated, an environment 100 includes an indoor positioning system 105 that includes wireless nodes 110-1 through 110-X (referred to generally as wireless nodes 110 or wireless node 110), in which X>1, and a wireless node 115. Environment 100 also includes a user device 120.

The number of devices and networks, and the configuration in environment 100 are exemplary and provided for simplicity. According to other embodiments, environment 100 may include additional devices, fewer devices, different devices, and/or differently arranged devices, than those illustrated in FIG. 1A. For example, according to an embodiment, environment 100 may include multiple user devices 120 and/or multiple wireless nodes 115. Alternatively, according to an embodiment, indoor positioning system 105 may not include wireless node 115.

According to other embodiments, a single device may be implemented as multiple devices and/or multiple devices may be implemented as a single device. A device may be implemented according to a centralized computing architecture or a distributed computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. Environment 100 includes wireless connections among the devices illustrated. By way of example, user device 120 may wirelessly connect to indoor positioning system 105.

Indoor positioning system 105 includes a network that provides or facilitates indoor positioning services. Indoor positioning system 105 may also provide user access to other networks. Wireless node 110 includes a device capable of wireless communication. For example, wireless node 110 may take the form of a base station, a beacon device, a transmitter device, a transceiver device, or other type of wireless communication device.

Wireless node 115 includes a device capable of wireless and/or wired communication. For example, wireless node 115 may take the form of a computational device (e.g., a server device, a computer, etc.). User device 120 includes a device capable of wireless communication. For example, user device 120 may take the form of a mobile device (e.g., a smartphone, a personal digital assistant (PDA), a tablet device, etc.).

FIG. 1B is a diagram illustrating an exemplary process of indoor positioning based on a rake receiver. It may be assumed that user device 120 includes a rake receiver 125 and a location calculator component 130.

Figure 4:
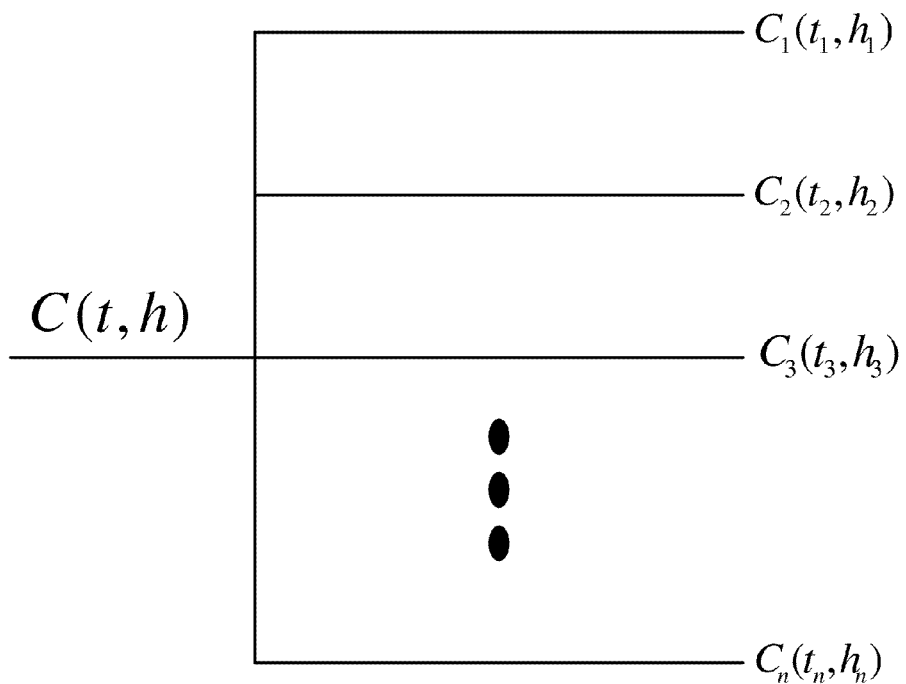
FIG. 4 is a diagram illustrating an exemplary antenna of a rake receiver.

As illustrated, according to an exemplary scenario, assume that user device 120 receives multiple signals 150 from multiple wireless nodes 110 via rake receiver 125. FIG. 4 is a diagram illustrating an exemplary antenna of rake receiver 125. The array includes fingers 1 to n. The number of fingers illustrated in FIG. 4 is exemplary. Signals may be received with a time delay in rake receiver 125.

The maximum signal component (e.g., in terms of power, amplitude, etc.) of the received signal may be expressed according to the following equation:

$$RS_{MAX} = \text{Max}\{C(t_1, h_1), C(t_2, h_2), C(t_3, h_3), \ldots, C(t_n, h_n)\} \quad (5)$$

in which C represents a component of the signal, t represents time, and h represents the transfer function for a particular delay. According to an exemplary embodiment, rake receiver 125 may identify $RS_{MAX}$ since the discrete signals per path, $C_n(t, h_n)$, are available to rake receiver 125. According to another embodiment, location calculator 130 or some other component may calculate $RS_{MAX}$ based on the received signal via rake receiver 125.

Figure 5:
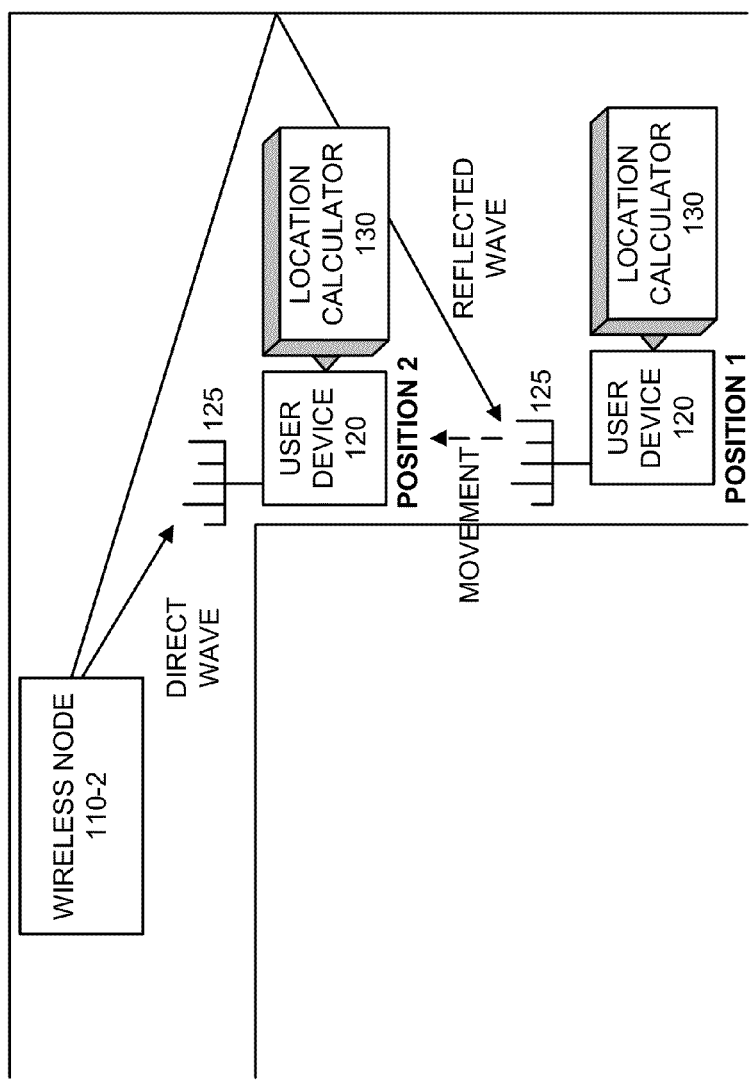
FIG. 5 is a diagram illustrating an exemplary scenario pertaining to calculating an indoor position.
Figure 6:
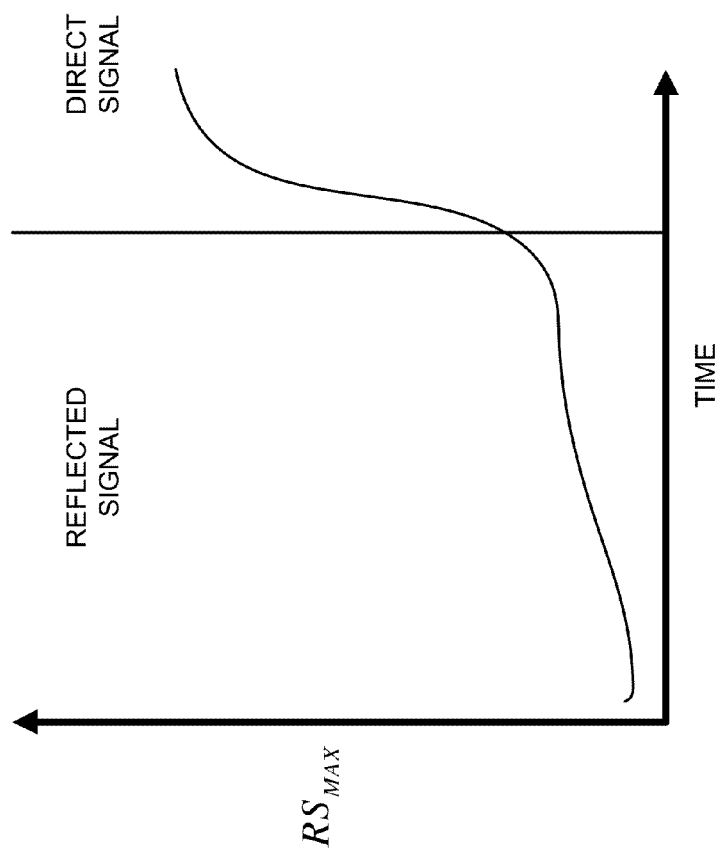
FIG. 6 is a graph illustrating a relationship between received signal strength ($RS_{MAX}$) over time relative to reflected and direct signals.

As previously described, it may be assumed that the most direct wave will be the strongest, in terms of power, etc., of the received parts. The above assumption should be true in the case where there is a line of sight (LOS) or direct wave component available in the received signal. In the case when there are only reflected components, the most direct wave will be identified as $RS_{MAX}$. This may introduce an error with respect to distance and/or indoor position calculations. However, this error can be corrected in retrospect once a direct wave is received. By way of example and referring to FIG. 5, assume user device 120 moves from position 1, in which wireless node 110-2 is initially hidden from user device 120, toward position 2, in which wireless node 110-2 is within a direct line of sight relative to user device 120. Such an occurrence should cause a detectable increase in $RS_{MAX}$. That is, as illustrated in FIG. 6, a detectable increase in $RS_{MAX}$ should occur when user device 120 moves from position 1 to position 2.

According to the above scenario, the calculated distance to wireless node 110-2 would be incorrect for the reflected wave, but correct once the direct wave is received. For example, location calculator 130 calculates the position of user device 120 at position 1 based on known positioning algorithms (e.g., triangulation, time of arrival (TOA), time difference of arrival (TDOA), phase of arrival (POA), location fingerprinting-based positioning, angle of arrival (AOA), also known as direction of arrival (DOA), proximity algorithms (e.g., that provide symbolic relative location), etc.). However, the distance error and/or the position error associated with the calculated position 1 of user device 120 may be corrected once the direct wave is received via rake receiver 125 at position 2 and location calculator 130 calculates the position of user device 120. In this way, various performance metrics associated with indoor positioning may be improved, such as accuracy, precision, etc.

Figure 7:
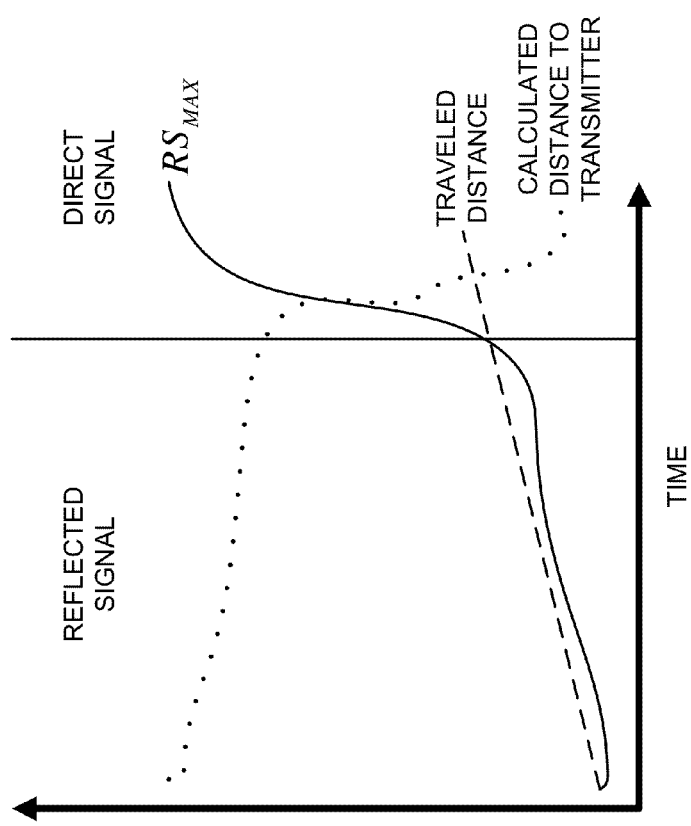
FIG. 7 is a graph illustrating exemplary data that may be used to correct distant errors.

According to an exemplary embodiment, user device 120 may include various sensors and/or other devices that may contribute to calculating the position of user device 120. By way of example, user device 120 may include an accelerometer, a gyroscope, a compass, an optical sensor (e.g., a camera), etc. According to such an embodiment, continuous measurement or collection of data is obtained during the time period between user device 120 at position 1 and user device 120 at position 2. In this way, factors such as distance traveled, orientation, etc., may be determined and thus the error(s) imposed by reflected signal(s) may be corrected. As an example, when an indoor positioning service includes indoor tracking or indoor navigation, past positions may be relevant and may be corrected. FIG. 7 is a diagram illustrating a graphical representation of data over time that may be used to compensate or correct errors based on received reflected waves. As illustrated, the $RS_{MAX}$ curve indicates a significant increase over time between the receipt of reflected signal(s) and direct signal(s). Additionally, the calculated distance to transmitter curve indicates a significant decrease between the receipt of reflected signal(s) and direct signal(s). As further illustrated in FIG. 7, the distance traveled indicates a linear increase in distance.

Referring back to FIG. 5, according to other scenarios, user device 120 may move from position 2, in which a direct line of sight exists between user device 120 and wireless node 110-2 and direct wave(s) is/are received via rake receiver 125, to position 1, in which the direct line of sight is lost and only reflected wave(s) is/are received via rake receiver 125. According to such scenarios, user device 120 may correctly calculate positions (e.g., position 1, position 0 (not illustrated), etc.) based on a converse application of the principles described above. For example, the continuous measurement or collection of data may permit user device 120 to correct subsequent calculations of distance and/or position based on distance and/or position information associated with position 2.

FIG. 1C is a diagram illustrating another exemplary process of indoor positioning based on a rake receiver. Similar to FIG. 1B, it may be assumed that user device 120 includes rake receiver 125. According to this process, user device 120 may receive signals 150 and identify $RS_{MAX}$ by rake receiver 125. User device 120 transmits signals 155 to report $RS_{MAX}$ to wireless node 115. As illustrated, wireless node 115 includes location calculator component 130 and calculates the position of user device 120 based on $RS_{MAX}$ and the constant path loss exponent, $\gamma$. The position of user device 120 may be provided to the user of user device 120, provided to administrators of indoor positioning system 105, etc.

Figure 1D:
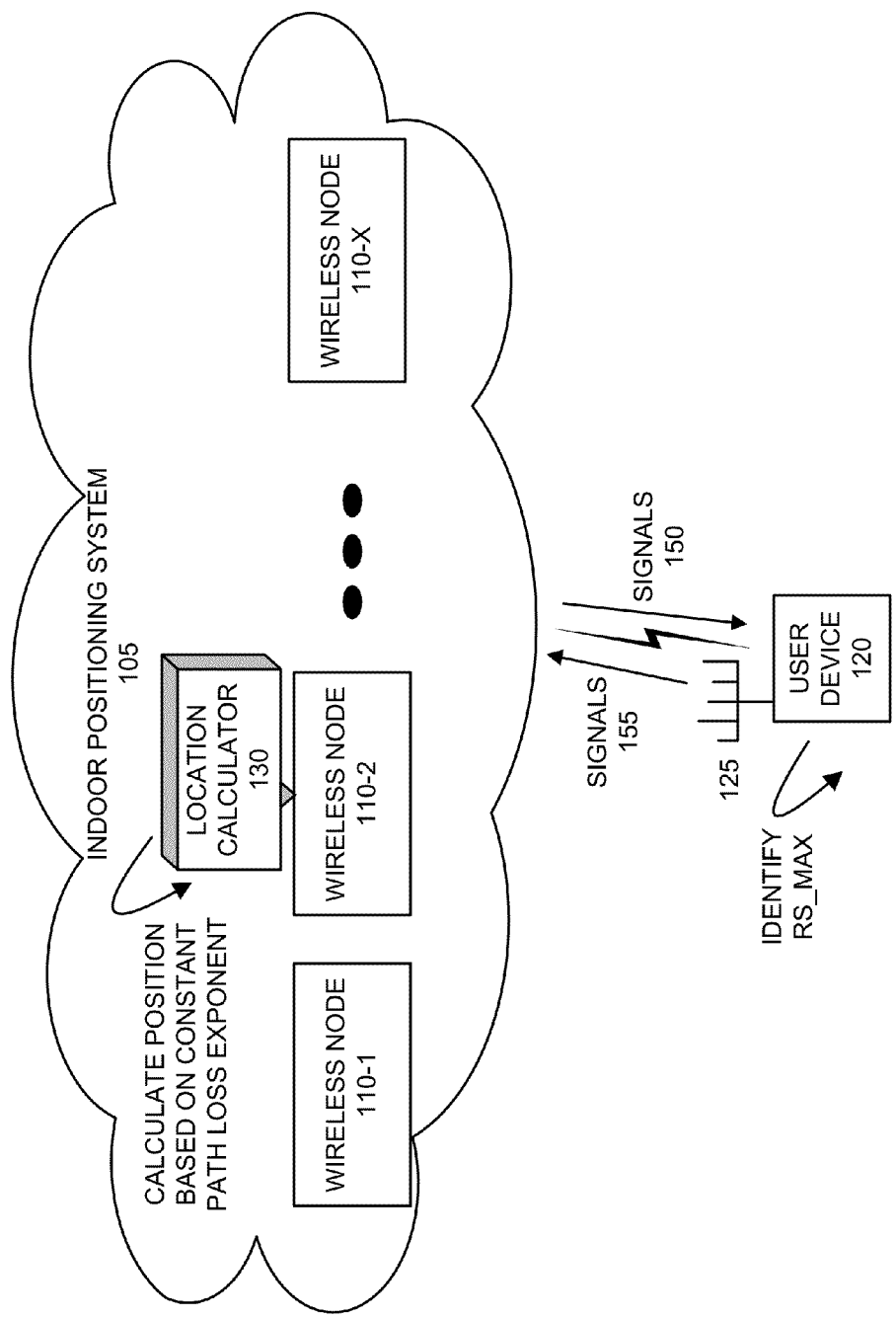
FIG. 1D is a diagram illustrating yet another exemplary process of indoor positioning based on a rake receiver.

FIG. 1D is a diagram illustrating yet another exemplary process of indoor processing based on a rake receiver. Similar to FIG. 1C, user device 120 may receive signals 150 and identify $RS_{MAX}$. User device 120 transmits signals 155 to report $RS_{MAX}$ to wireless node 110. As illustrated, wireless node 110 includes location calculator component 130 and calculates the position of user device 120 based on $RS_{MAX}$ and the constant path loss exponent, $\gamma$. The position of user device 120 may be provided to the user of user device 120, provided to administrators of indoor positioning system 105, etc.

Figure 2:
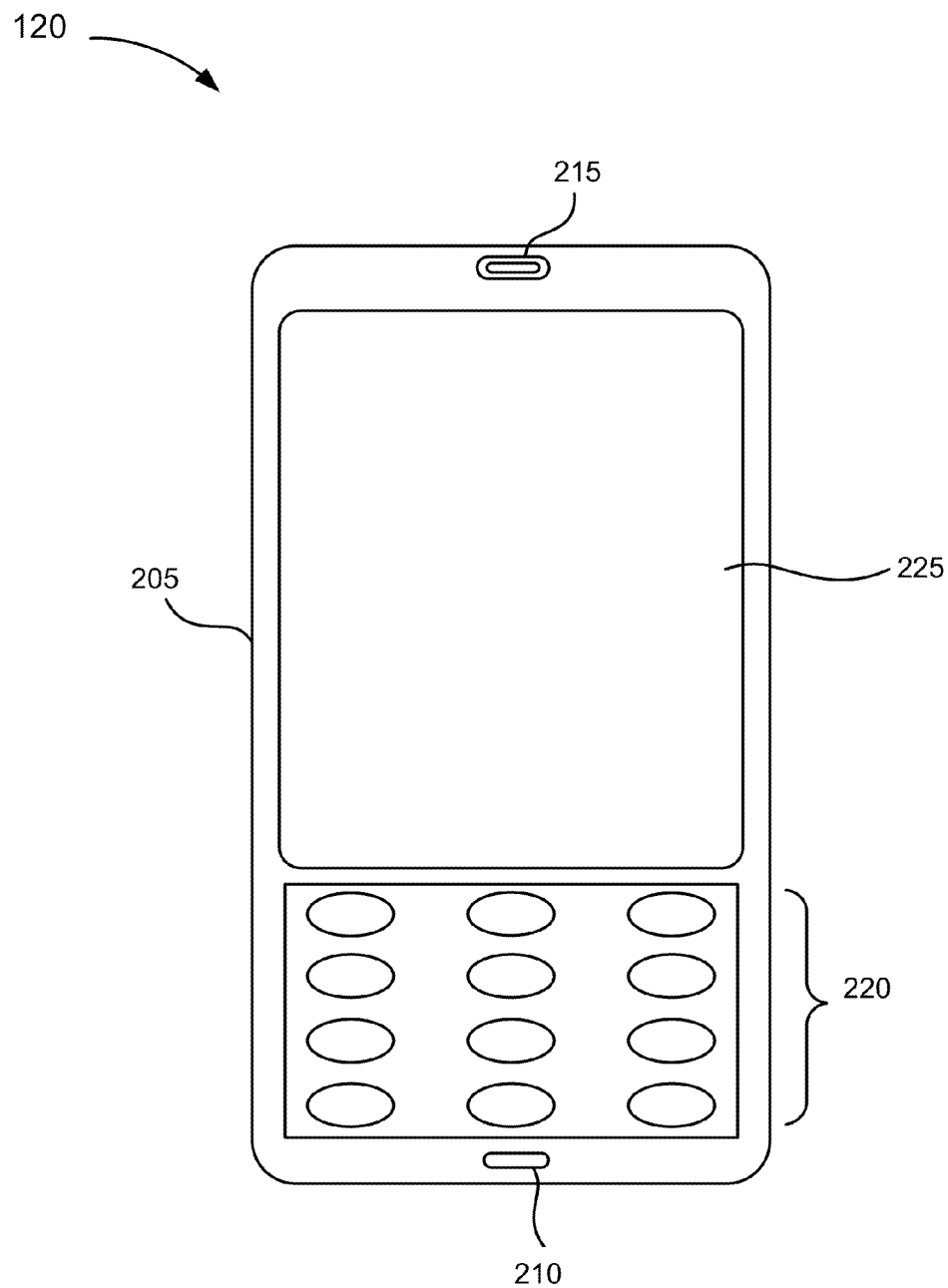
FIG. 2 is a diagram illustrating an exemplary user device.

FIG. 2 is a diagram illustrating an exemplary user device 120. As illustrated in FIG. 2, user device 120 may comprise a housing 205, a microphone 210, speakers 215, keys 220, and a display 225. According to other embodiments, user device 120 may comprise fewer components, additional components, different components, and/or a different arrangement of components than those illustrated in FIG. 2 and described herein.

Housing 205 may comprise a structure to contain components of user device 120. For example, housing 205 may be formed from plastic, metal, or some other type of material. Housing 205 may support microphone 210, speakers 215, keys 220, and display 225.

Microphone 210 may transduce a sound wave to a corresponding electrical signal. For example, a user may speak into microphone 210 during a telephone call or to execute a voice command Speakers 215 may transduce an electrical signal to a corresponding sound wave. For example, a user may listen to music or listen to a calling party through speakers 215.

Keys 220 may provide input to user device 120. For example, keys 220 may comprise a standard telephone keypad, a QWERTY keypad, and/or some other type of keypad (e.g., a calculator keypad, a numerical keypad, etc.). Keys 220 may also comprise special purpose keys to provide a particular function (e.g., send, call, e-mail, etc.).

Display 225 may operate as an output component. For example, display 225 may comprise a liquid crystal display (LCD), a plasma display panel (PDP), a field emission display (FED), a thin film transistor (TFT) display, or some other type of display technology.

Additionally, according to an exemplary implementation, display 225 may operate as an input component. For example, display 225 may comprise a touch-sensitive screen. In such instances, display 225 may correspond to a single-point input device (e.g., capable of sensing a single touch) or a multipoint input device (e.g., capable of sensing multiple touches that occur at the same time). Further, display 225 may be implemented using a variety of sensing technologies, such as, for example, capacitive sensing, surface acoustic wave sensing, resistive sensing, optical sensing, pressure sensing, infrared sensing, or gesture sensing. Display 225 may also comprise an auto-rotating function.

Display 225 may be capable of displaying text, pictures, and/or video. Display 225 may also be capable of displaying various images (e.g., icons, objects, a virtual keypad, etc.) that may be selected by a user to access various applications, enter data, navigate through user interfaces, etc.

Figure 3:
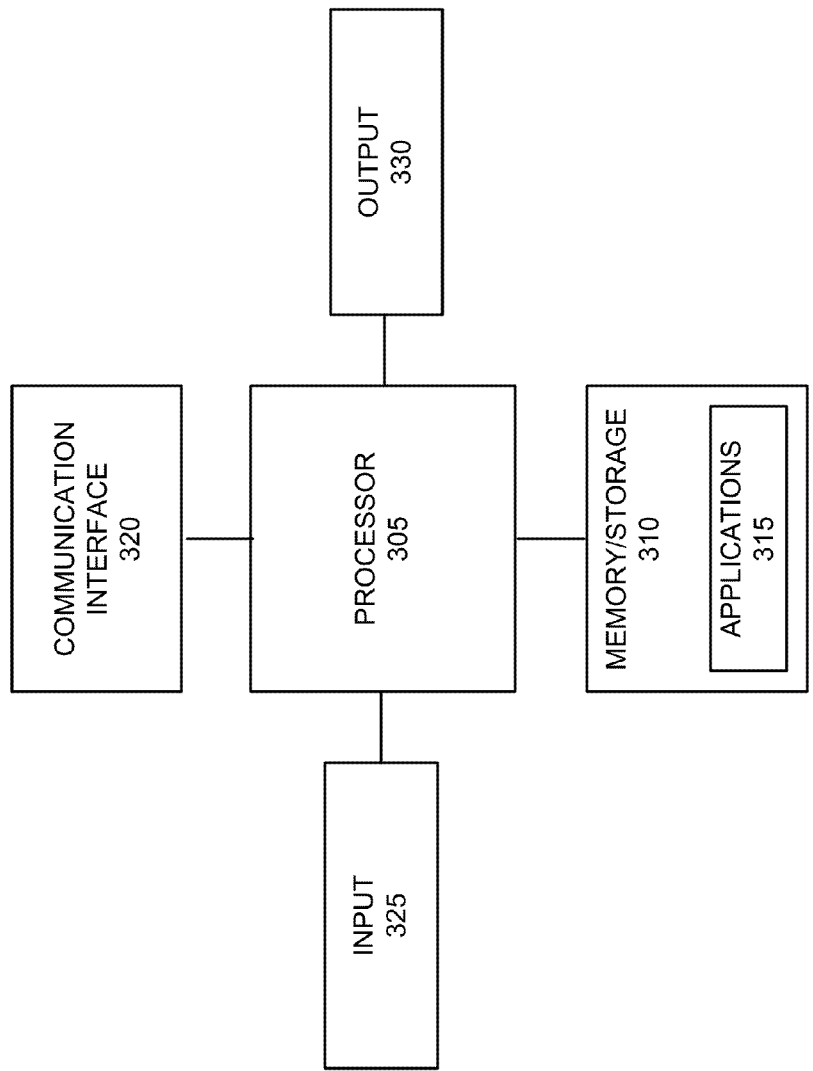
FIG. 3 is a diagram illustrating exemplary components of a user device.

FIG. 3 is a diagram illustrating exemplary components of user device 120. As illustrated, user device 120 may comprise a processor 305, a memory/storage 310 that may comprise applications 315, a communication interface 320, an input 325, and an output 330. According to other embodiments, user device 120 may comprise fewer components, additional components, different components, or a different arrangement of components than those illustrated in FIG. 3 and described herein. Additionally, wireless node 110 and/or wireless node 115 may include the components illustrated in FIG. 3 and described herein.

Processor 305 may comprise one or multiple processors, microprocessors, co-processors, application specific integrated circuits (ASICs), controllers, central processing units (e.g., one or multiple cores), programmable logic devices, chipsets, field programmable gate arrays (FPGAs), application specific instruction-set processors (ASIPs), system-on-chips (SoCs), microcontrollers, central processing units (CPUs), and/or some other component that may interpret and/or execute instructions and/or data. Processor 305 may be implemented as hardware (e.g., a microprocessor, etc.), a combination of hardware and software (e.g., a SoC, etc.), may include one or multiple memories (e.g., memory/storage 310), buses, etc.

Processor 305 may control the overall operation or a portion of operation(s) performed by user device 120. Processor 305 may perform one or more operations based on an operating system and/or various applications (e.g., applications 315). Processor 305 may access instructions from memory/storage 310, from other components of user device 120, and/or from a source external to user device 120 (e.g., a network or another device).

Memory/storage 310 may comprise one or multiple memories. For example, memory/storage 310 may comprise a random access memory (RAM), a dynamic random access memory (DRAM), a read only memory (ROM), a static random access memory (SRAM), a single in-line memory module (SIMM), a dual in-line memory module (DIMM), a programmable read only memory (PROM), a flash memory, and/or some other type of memory. Memory/storage 310 may comprise a hard disk (e.g., a magnetic disk, an optical disk, a magneto-optic disk, a solid state disk, etc.) along with a corresponding drive.

Memory/storage 310 may be external to and/or removable from user device 120, such as, for example, a Universal Serial Bus (USB) memory, a dongle, a hard disk, mass storage, off-line storage, or some other type of storing medium (e.g., a compact disk (CD), a digital versatile disk (DVD), a Blu-Ray™ disk (BD), etc). Memory/storage 310 may store data, application(s), and/or instructions related to the operation of user device 120, wireless node 110, or wireless node 115.

Applications 315 may comprise software or a program that provides various services or functions. By way of example and with reference to user device 120, applications 315 may comprise a telephone application, a multi-media application, an e-mail application, a contacts application, a calendar application, an instant messaging application, a web browsing application, a location-based application (e.g., a Global Positioning System (GPS)-based application, etc.), etc. According to an exemplary embodiment and with reference to user device 120, application 315 includes a positioning application. The positioning application includes an algorithm to calculate an indoor position of user device 120 based on $RS_{MAX}$ and a constant, free space (i.e., air) path loss exponent. In other words, the algorithm incorporates $RS_{MAX}$ and a constant, free space (i.e., air) path loss exponent into known positioning approaches (e.g., triangulation, etc.). Additionally, according to an exemplary embodiment, the positioning application includes a position compensator function that compensates for distance errors and user or device position errors based on the relative values of $RS_{MAX}$ over time. For example, when the indoor positioning service includes navigation or indoor tracking, the position compensator function may be implemented.

Additionally, according to an exemplary embodiment and with reference to wireless nodes 110 and 115, applications 315 include a positioning application. The positioning application includes an algorithm to calculate an indoor position of user device 120 based on $RS_{MAX}$ and a constant, free space (i.e., air) path loss exponent.

Communication interface 320 may permit user device 120 to communicate with other devices, networks, and/or systems. For example, communication interface 320 may comprise one or multiple wireless and/or wired communication interfaces. Communication interface 320 may comprise a transmitter, a receiver, and/or a transceiver. According to an exemplary embodiment and with reference to user device 120, communication interface 320 includes rake receiver 125. Rake receiver 125 may include components pertaining to channel estimation, channel decoding, interpolation, etc., depending on the form of wireless communication (e.g., Bluetooth, Code Division Multiple Access (CDMA), Ultra Wide Band (UWB), WiFi, radio signals, etc.) between user device 120 and indoor positioning system 105. Additionally, according to an exemplary embodiment, rake receiver 125 may include a component to determine $RS_{MAX}$. For example, $RS_{MAX}$ may be determined based on amplitude, power, or some other suitable signal characteristic.

According to an exemplary embodiment and with reference to wireless nodes 110 and/or 115, communication interface 320 includes a rake receiver. Communication interface 320 may operate according to various protocols, communication standards, or the like.

Input 325 may permit an input into user device 120. For example, input 325 may comprise a microphone (e.g., microphone 210), keys (e.g., keys 220), a display (e.g., display 225 that includes a touchscreen), a touchpad, a button, a switch, a camera, an input port, voice recognition logic, fingerprint recognition logic, a web cam, a mouse, a keyboard, and/or some other type of visual, auditory, tactile, etc., input component. Output 330 may permit user device 120 to provide an output. For example, output 330 may comprise speakers (e.g., speakers 215), a display (e.g., display 225), one or more light emitting diodes (LEDs), an output port, a vibratory mechanism, and/or some other type of output component.

User device 120 may perform operation(s) and/or process(es) in response to processor 305 executing instructions (e.g., applications 315) stored by memory/storage 310. For example, the instructions may be read into memory/storage 310 from another memory/storage 310 or from another device via communication interface 320. The instructions stored by memory/storage 310 may cause processor 305 to perform one or more processes described herein. Alternatively, for example, user device 120 may perform one or more processes based on the execution of hardware (e.g., processor 305, etc.), the execution of hardware and firmware, or the execution of hardware, software (e.g., applications 215), and firmware. Wireless nodes 110 and 115 may operate in a similar manner.

Figure 8A:
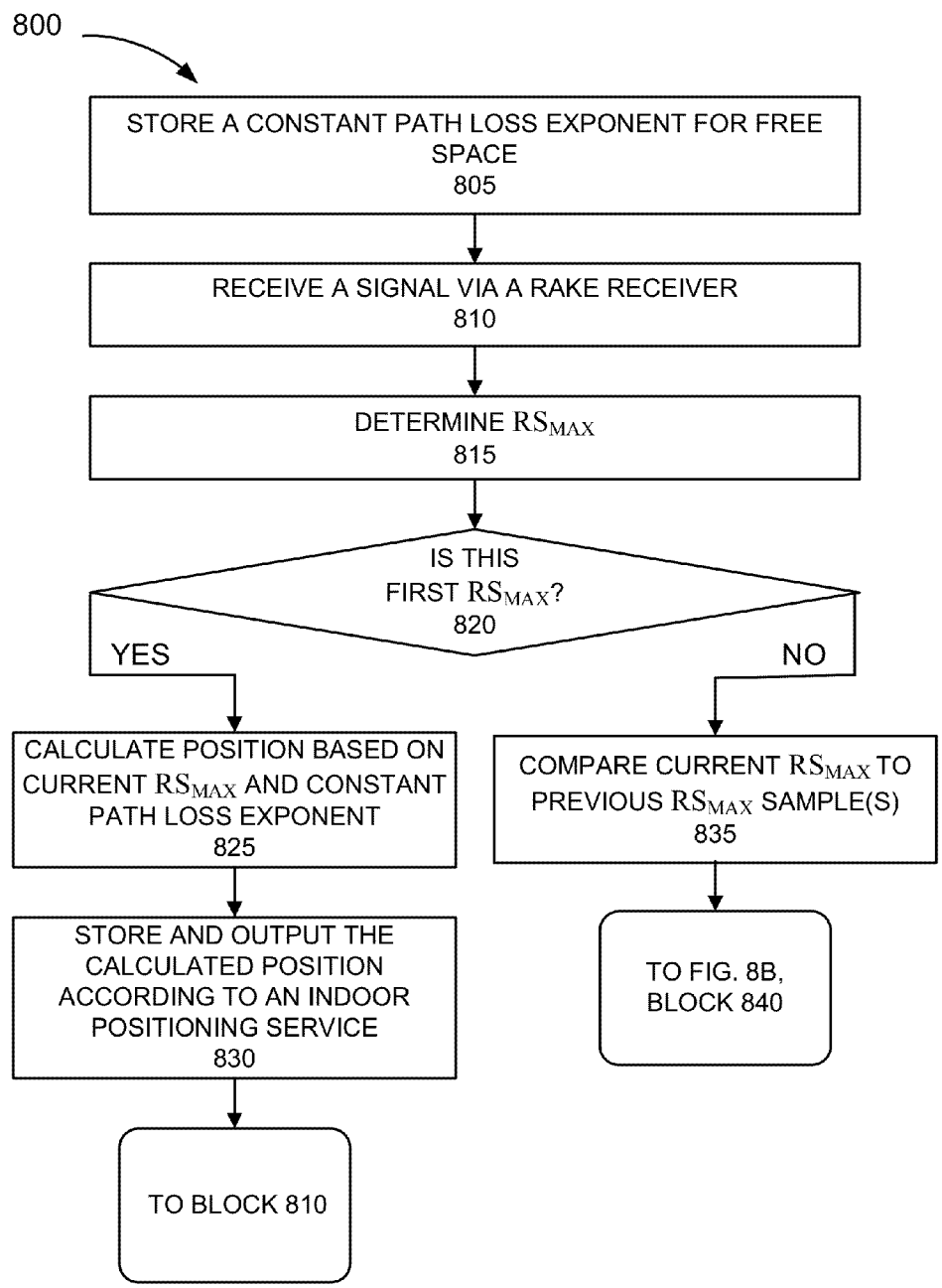
FIGS. 8A-8C are flowcharts illustrating an exemplary process for calculating an indoor position of a user or a device.
Figure 8B:
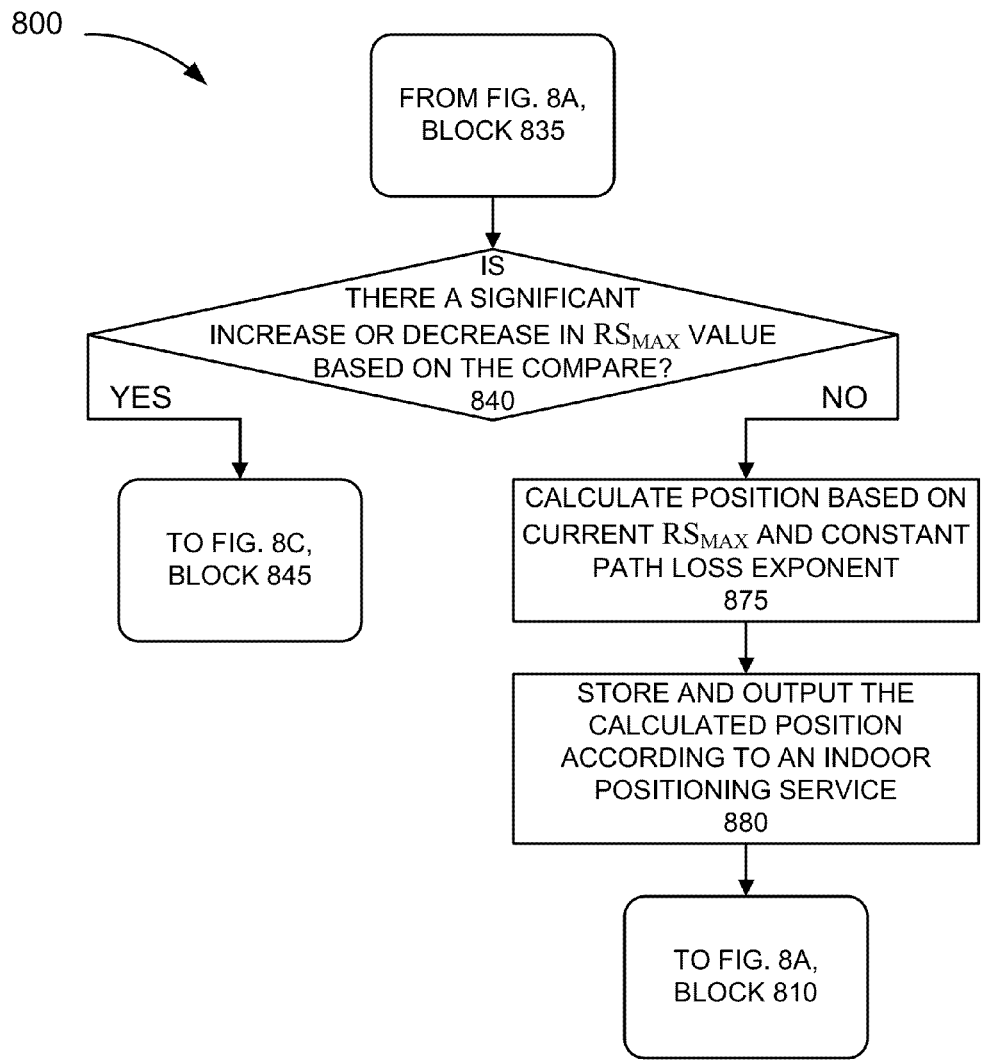
Figure 8C:
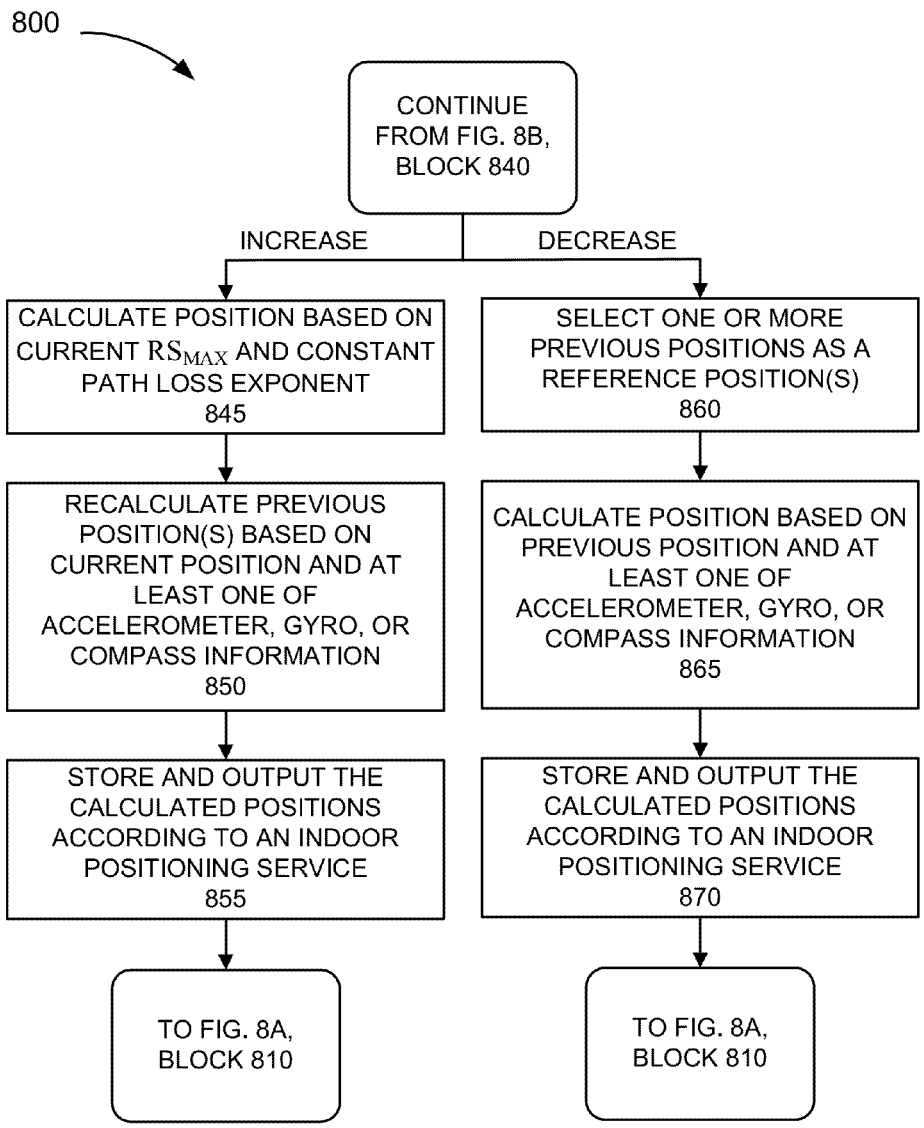

FIGS. 8A-8C are flowcharts illustrating an exemplary process 800 for calculating a position of a user or a device. According to an exemplary implementation, one or more steps of process 800 may be performed by user device 120. For example, processor 305 may execute an application 315 (e.g., a positioning application) stored by memory/storage 310. Alternatively, one or more steps of process 800 may be performed by wireless nodes 110 and/or 115.

Referring to FIG. 8A, process 800 may begin with block 805, in which a constant path loss exponent for free space is stored. For example, as previously described, the constant path loss exponent may have a value between 2.0 and 2.1. Additionally, as previously described, according an exemplary embodiment, the path loss exponent may be partially dynamic based on factors associated with air, such as, temperature, humidity, pressure, etc. Additionally, frequency of signals may impact the value of the path loss exponent. According to an exemplary embodiment, user device 120 may store the constant path loss exponent. According to another embodiment, wireless node 110 or wireless node 115 may store the constant path loss exponent.

In block 810, a signal is received via a rake receiver. For example, as previously described, user device 120 may receive a signal via rake receiver 125. The signal may pertain to other services (e.g., Web access, etc.) or may be a dedicated signal transmitted by wireless nodes 110.

In block 815, the $RS_{MAX}$ is determined. For example, as previously described, user device 120 determines $RS_{MAX}$ based on the signal received via rake receiver 125 (e.g., according to equation (5)). According to an exemplary embodiment, rake receiver 125 may include a component to determine $RS_{MAX}$. Alternatively, user device 120 may include another component that determines $RS_{MAX}$ based on signal information provided by rake receiver 125.

In block 820, it is determined whether this is the first $RS_{MAX}$. For example, user device 120 may store a database or a data structure that includes $RS_{MAX}$ values and timestamps. Alternatively, wireless node(s) 110 or wireless node 115 may store this information when wireless node 110 or wireless node 115 calculates the position of user device 120. For example, as previously described, user device 120 may report $RS_{MAX}$ to wireless node 110 or wireless node 115.

If it is determined that this is the first $RS_{MAX}$ (block 820—YES), then a position of user device 120 is calculated based on the current $RS_{MAX}$ and the constant path loss exponent (block 825). For example, according to an embodiment, user device 120 may calculate the position of user device 120. According to another embodiment, wireless node 110 or wireless node 115 may calculate the position of user device 120 based on a reporting of $RS_{MAX}$ to wireless node 110 or wireless node 115. As previously described, there are various positioning algorithms (e.g., triangulation, etc.) that may be used to determine the position of user device 120.

In block 830, the calculated position is stored and outputted according to an indoor positioning service. User device 120, wireless node 110, and/or wireless node 115 may store the calculated position. According to an exemplary embodiment, when wireless node 110 or wireless node 115 calculates the position of user device 120, wireless node 110 or wireless node 115 may output (e.g., transmit) the position information to user device 120. Alternatively, when user device 120 calculates its own position, user device 120 may output the calculated position to a user via a graphical user interface, provided on, for example, display 225. As previously described, an indoor positioning service may include one or more types of positioning services, such as, indoor positioning, indoor tracking, indoor navigation, and other location-based services. Thus, depending on the indoor positioning service provided by or via indoor positioning system 105, various types of position information may be generated. The position information may be outputted and used according to the indoor positioning service. As illustrated in FIG. 8A, process 800 continues to block 810. Process 800 may terminate based on various triggering events (e.g., user device 120 is turned off, etc.).

If it is determined that this is not the first $RS_{MAX}$ (block 820—NO), then the current $RS_{MAX}$ is compared to previous $RS_{MAX}$ samples (block 835). For example, depending on which device stores $RS_{MAX}$ values (e.g., user device 120, wireless nodes 110 or 115), a comparison between the current $RS_{MAX}$ value and previous $RS_{MAX}$ values may be performed to identify whether a significant increase or decrease in $RS_{MAX}$ has occurred. For example, a threshold value, a range of values, and/or an $RS_{MAX}$ signature may be used when performing the comparison. Additionally, this process may include selecting a particular threshold value, signature, etc., to render a comparison, based on the current or proximate position of user device 120. For example, based on floor plan information, etc., particular threshold value(s), signature(s), etc., may be tailored to current or proximate positions.

Referring to FIG. 8B, in block 840, it is determined whether a significant increase or decrease in $RS_{MAX}$ value occurred based on the comparison. For example, as previously described, a significant increase in $RS_{MAX}$ may be indicative of a direct wave (or strong reflective wave) and a significant decrease in $RS_{MAX}$ may be indicative of a reflective wave.

If it is determined that there is a significant increase or decrease in $RS_{MAX}$ (block 840—YES), then a position of user device 120 is calculated based on the current $RS_{MAX}$ and the constant path loss exponent (block 845), as illustrated in FIG. 8C. For example, if there is a significant increase in $RS_{MAX}$ (indicating that a direct signal is received), then similar to that described in block 825, the position of user device 120 may be calculated.

In block 850, previous position(s) is/are recalculated based on the current position and at least one of accelerometer, gyroscope, or compass information. For example, when previous position is relevant to the indoor positioning service (e.g., indoor navigation, indoor tracking, etc.) or the current position, previous position(s) may be recalculated. According to an exemplary embodiment, the previous position(s) is/are recalculated based on sensor data. For example, sensor data history (e.g., distance traveled, direction, acceleration, etc.) may be used relative to the current position (e.g., as a reference position) to recalculate and perhaps modify previous position(s).

According to an exemplary embodiment, a weighting system may be used based on a correlation between the increase in $RS_{MAX}$ and the current position. For example, at least in some instances, it may be assumed that when the increase in $RS_{MAX}$ is significantly large, the reliability, certainty, or accuracy of the current position and/or distance may be such that recalculated position(s) and/or recalculated distance(s) may be used as the previous position(s) and/or previous distance(s) versus, for example, averaging recalculated previous position(s) and/or previous distance(s) based on the sensor data and previous position(s) and/or previous distance(s) initially calculated without the use of the sensor data. The significantly large increase may be a user configurable value, range of values, signature, etc. According to another embodiment, the weighting system may not be used.

In block 855, the calculated positions are stored and outputted according to an indoor positioning service. Similar to that previously described in block 830, the calculated positions are stored and outputted according to the indoor positioning service. As illustrated in FIG. 8C, process 800 continues to block 810. Process 800 may terminate based on various triggering events (e.g., user device 120 is turned off, etc.).

Referring to block 860, if there is a significant decrease in $RS_{MAX}$ (indicating that a reflected signal is received), then one or more previous position(s) is/are selected as a reference position(s). For example, similar to that previously described, in which the current position may serve as a reference position when there is a significant increase in $RS_{MAX}$, a previous position(s) may serve as reference position(s) when there is a significant decrease in $RS_{MAX}$. The selection of a previous position is based on previous $RS_{MAX}$ value(s) relative to the current $RS_{MAX}$ value. Similar to that previously described, a threshold value, range, signature, etc., may be used to select the previous position.

In block 865, the current position is calculated based on previous position and at least one of accelerometer, gyroscope, or compass information. For example, sensor data history (e.g., distance traveled, direction, acceleration, etc.) may be used relative to the previous position to calculate a current position. For example, at least in some instances, it may be assumed that when the decrease is significantly large, the reliability, certainty, or accuracy of the previous position may be such that the current position may be calculated based on previous position and sensor data.

Additionally, according to an exemplary embodiment, a weighting system may be used. That is, when the decrease in $RS_{MAX}$ is significantly large, the current position is calculated based on the previous position and the sensor data. Otherwise when $RS_{MAX}$ is not significantly large, an averaging of distance or an average position may be calculated and used as a current position. For example, a current position based on the current $RS_{MAX}$ and constant path loss exponent is averaged with a current position based on sensor data. According to another exemplary embodiment, a weighting system may not be used to calculate the current position.

In block 870, the calculated positions are stored and outputted according to an indoor positioning service. Similar to that previously described in block 830, the calculated/recalculated positions are stored and outputted according to the indoor positioning service. As illustrated in FIG. 8B, process 800 continues to block 810. Process 800 may terminate based on various triggering events (e.g., user device 120 is turned off, etc.).

Referring to FIG. 8B, if it is determined that there is not a significant increase or decrease in $RS_{MAX}$ (block 840—NO), then a position of user device 120 is calculated based on the current $RS_{MAX}$ and the constant path loss exponent (block 875). Similar to that previously described in block 825, the position of user device 120 is calculated.

In block 880, the calculated position is stored and outputted according to an indoor positioning service. Similar to that previously described in block 830, the calculated/recalculated positions are stored and outputted according to the indoor positioning service. As illustrated in FIG. 8B, process 800 continues to block 810. Process 800 may terminate based on various triggering events (e.g., user device 120 is turned off, etc.).

Although FIGS. 8A-8C illustrate an exemplary process 800, in other implementations, process 800 may include additional operations, fewer operations, and/or different operations than those illustrated and described with respect to FIGS. 8A-8C.

The above-mentioned principles also may apply to third, fourth, etc., reflections of a signal depending on how much data history is stored. For example, if the user moves from a direct position to an indirect position, it is likely that user device 120 receives a reflected wave, and moving further away may result in a new "reflection detection," which may correlate to a second reflection, a third reflection, etc. The reverse scenario also applies in which a user moves from an indirect position to a direct position. That is, the waves may gradually transition from a third reflection, to a second reflection, to a first reflection, and to a direct wave. According to an exemplary embodiment, the information may be stored and used to compensate and/or recalculate distance(s) and/or position(s).

The foregoing description of implementations provides illustration, but is not intended to be exhaustive or to limit the implementations to the precise form disclosed. Modifications and variations are possible in light of the above teachings or may be acquired from practice of the teachings. For example, receivers other than rake receives may be used.

The terms "comprise," "comprises," "comprising," as well as synonyms thereof (e.g., include, etc.), when used in the specification is taken to specify the presence of stated features, integers, steps, or components but does not preclude the presence or addition of one or more other features, integers, steps, components, or groups thereof. In other words, these terms mean inclusion without limitation.

In addition, while a series of blocks is described with regard to the process illustrated in FIGS. 8A-8C, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." This logic or this component may include, for example, hardware (e.g., processor 305, etc.), a combination of hardware and software (e.g., applications 315), a combination of hardware and firmware, or a combination of hardware, software, and firmware. The embodiments have been described without reference to the specific software code since software can be designed to implement the embodiments based on the description herein. Additionally, a non-transitory storage medium may store instructions, which when executed, may perform processes and/or functions pertaining to the exemplary embodiments described herein. The non-transitory storage medium includes memory/storage 310.

The article "a," "an," and "the" are intended to mean one or more items. Further, the phrase "based on" is intended to mean "based, at least in part, on" unless explicitly stated otherwise. The term "and/or" is intended to mean any and all combinations of one or more of the listed items.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction used in the present application should be construed as critical or essential to the implementations described herein unless explicitly described as such.

What is claimed is:

1. A method comprising:
   storing a constant path loss exponent corresponding to free space;
   receiving a signal via a rake receiver of a user device;
   identifying a maximum received signal strength, during an instant t, based on a signal strength associated with the signal relative to fingers of the rake receiver;
   storing a current maximum received signal strength value based on the identifying;
   determining whether the current maximum received signal strength value is a first time stamped maximum of maximum received signal strength values that are stored corresponding to a sequence of samples of signal strengths received;
   calculating a current indoor position of the user device based on the constant path loss exponent and the current maximum received signal strength value when a determination is that the current maximum received signal strength value is the first time stamped maximum of maximum received signal strength values, wherein the constant path loss exponent is used regardless of a type of multipath environment in which the user device resides; and
   outputting the current indoor position.

2. The method of claim 1, further comprising:
   transmitting the signal;
   storing previously identified maximum received signal strength values, wherein the determining comprises:
   comparing the current maximum received signal strength value to one or more previously identified maximum received signal strength values; and
   determining whether a difference in maximum received signal strength value, based on the comparing, indicates receipt by the user device of a direct signal component of the signal or a reflective signal component of the signal.

3. The method of claim 2, further comprising:
   calculating the current indoor position of the user device based on the constant path loss exponent and the compared, current maximum received signal strength value when the difference indicates that the compared, current maximum received signal strength value corresponds to the direct signal component of the signal; and
   recalculating one or more previous indoor positions of the user device based on the current indoor position of the user device associated with the compared, current maximum received signal strength value.

4. The method of claim 3, further comprising:
   recalculating the one or more previous indoor positions of the user device based on at least one of accelerometer data, gyroscope data, or compass data pertaining to the user device.

5. The method of claim 2, further comprising:
   storing previous indoor positions of the user device;
   determining, based on the comparing, that the difference in maximum received signal value indicates receipt by the user device of the reflective signal component of the signal; and selecting one or more of the previous indoor positions as one or more reference indoor positions in response to determining that the difference in maximum received signal strength value indicates receipt by the user device of the reflective signal component of the signal.

6. The method of claim 5, further comprising:
calculating a current indoor position of the user device based on the constant path loss exponent, the selected one or more previous indoor positions, and at least one of accelerometer data, gyroscope data, or compass data pertaining to the user device.

7. The method of claim 5, further comprising:
calculating a current indoor position of the user device based on a weighting system associated with the difference in maximum received signal strength value.

8. The method of claim 2, further comprising:
storing at least one of a threshold difference value, a range of difference values, or a maximum received signal strength signature; and
determining whether the difference in maximum received signal strength value indicates receipt by the user device of the direct signal component of the signal or the reflective signal component of the signal based on the at least one of the threshold difference value, the range of difference values, or the maximum received signal strength signature.

9. A user device comprising:
a rake receiver;
one or more memories that store instructions; and
one or more processors that execute the instructions to:
receive a signal via the rake receiver;
identify a maximum received signal strength, during an instant t, based on a signal strength associated with the signal relative to fingers of the rake receiver;
store a current maximum received signal strength value based on an identified maximum received signal strength;
determine whether the current maximum received signal strength value is a first time stamped maximum of maximum received signal strength values that are stored corresponding to a sequence of samples of signal strengths received; and
calculate a current indoor position of the user device based on a path loss exponent corresponding to free space and the current maximum received signal strength value when a determination is that the current maximum received signal strength value is the first time stamped maximum of maximum received signal strength values, wherein the path loss exponent is used by the user device regardless of a type of multipath indoor environment.

10. The user device of claim 9, wherein when calculating the current indoor position, the one or more processors further execute the instructions to:
calculate the current indoor position based on a triangulation algorithm.

11. The user device of claim 9, wherein the one or more processors further execute the instructions to:
store previously identified maximum received signal strength values, wherein when determining, the one or more processors further execute the instructions to:
compare the current maximum received signal strength value to one or more previously identified maximum received signal strength values; and
determine whether a difference in maximum received signal strength value, based on a comparison, indicates receipt by the user device of a direct signal component of the signal or a reflective signal component of the signal.

12. The user device of claim 11, wherein the one or more processors further execute the instructions to:
calculate the current indoor position of the user device based on the path loss exponent and the compared, current maximum received signal strength value when the difference indicates that the compared, current maximum received signal strength value corresponds to the direct signal component of the signal; and
recalculate one or more previous indoor positions of the user device based on the current indoor position of the user device associated with the compared, current maximum received signal strength value.

13. The user device of claim 12, wherein when recalculating, the one or more processors further execute the instructions to:
recalculate the one or more previous indoor positions of the user device based on at least one of accelerometer data, gyroscope data, or compass data pertaining to the user device.

14. The user device of claim 11, wherein the one or more processors further execute the instructions to:
store previous indoor positions of the user device;
determine, based on a comparison, that the difference in maximum received signal value indicates receipt by the user device of the reflective signal component of the signal; and
select one or more of the previous indoor positions as one or more reference positions in response to determining that the difference in maximum received signal strength value indicates receipt by the user device of the reflective signal component of the signal.

15. The user device of claim 14, wherein the one or more processors further execute the instructions to:
calculate a current indoor position of the user device based on the path loss exponent, the selected one or more previous indoor positions, and at least one of accelerometer data, gyroscope data, or compass data pertaining to the user device.

16. The user device of claim 9, wherein the path loss exponent is a dynamic value based on at least one of a measurement of temperature, humidity, or pressure of air pertaining to an indoor environment of the user device, or a signal frequency.

17. A non-transitory, computer-readable storage medium storing instructions that are executable by a processor of a device, which causes the device to:
identify a maximum received signal strength, during an instant t, based on a signal received via a rake receiver;
store a current maximum received signal strength value based on an identified maximum received signal strength;
determine whether the current maximum received signal strength value is a first time stamped maximum of maximum received signal strength values that are stored corresponding to a sequence of samples of signal strengths received; and
calculate one or more distances relative to one or more wireless nodes of an indoor positioning system based on a constant path loss exponent corresponding to free space and the current maximum received signal strength value when a determination is that the current maximum received signal strength value is the first time stamped maximum of maximum received signal strength values, wherein the constant path loss exponent is used regardless of a type of multipath environment in which the device resides.

18. The non-transitory, computer-readable storage medium of claim 17, further storing instructions that are executable by the processor of the device, which causes the device to:
store previously identified maximum received signal strength values;
compare the current maximum received signal strength value to one or more previously identified maximum received signal strength values; and
determine whether a difference in maximum received signal strength value, based on a comparison, indicates that the signal includes a direct signal component of the signal or a reflective signal component of the signal.

19. The non-transitory storage medium of claim 18, further storing instructions that are executable by the processor of the device, which causes the device to:
calculate a current indoor position of the device based on the constant path loss exponent and the compared, current maximum received signal strength value when the difference indicates that the compared, current maximum received signal strength value corresponds to the direct signal component of the signal; and
recalculate one or more previous indoor positions of the device based on the current indoor position of the device associated with the compared, current maximum received signal strength value.

20. The non-transitory storage medium of claim 18, further storing instructions that are executable by the processor of the device, which causes the device to:
store previous indoor positions of the device;
determine, based on a comparison, that the difference in maximum received signal value indicates receipt by the device of the reflective signal component of the signal; and
select one or more of the previous indoor positions as one or more reference indoor positions when the difference in maximum received signal strength value indicates receipt by the device of a reflective signal component of the signal; and
calculate a current indoor position of the device based on the constant path loss exponent, the selected one or more previous indoor positions, and at least one of accelerometer data, gyroscope data, or compass data pertaining to the device, wherein the current indoor position is calculated based on triangulation.

21. A method comprising:
storing a constant path loss exponent corresponding to free space;
receiving a signal via a rake receiver of a user device;
identifying a maximum received signal strength, during an instant t, based on a signal strength associated with the signal relative to fingers of the rake receiver;
storing a current maximum received signal strength value based on the identifying;
determining whether the current maximum received signal strength value indicates a significant increase in signal strength or a significant decrease in signal strength, relative to maximum received signal strength values that are stored corresponding to a sequence of samples of signal strengths received, based on a threshold value;
calculating a current indoor position of the user device based on the constant path loss exponent and the current maximum received signal strength value when a determination is that the current maximum received signal strength value indicates the significant increase in signal strength, wherein the constant path loss exponent is used regardless of a type of multipath environment in which the user device resides; and
calculating a current indoor position of the user device based on the constant path loss exponent, selected one or more previous indoor positions, and at least one of accelerometer data, gyroscope data, or compass data pertaining to the user device, when a determination is that the current maximum received signal strength value indicates the significant decrease in signal strength.

* * * * *